Patented Mar. 6, 1945

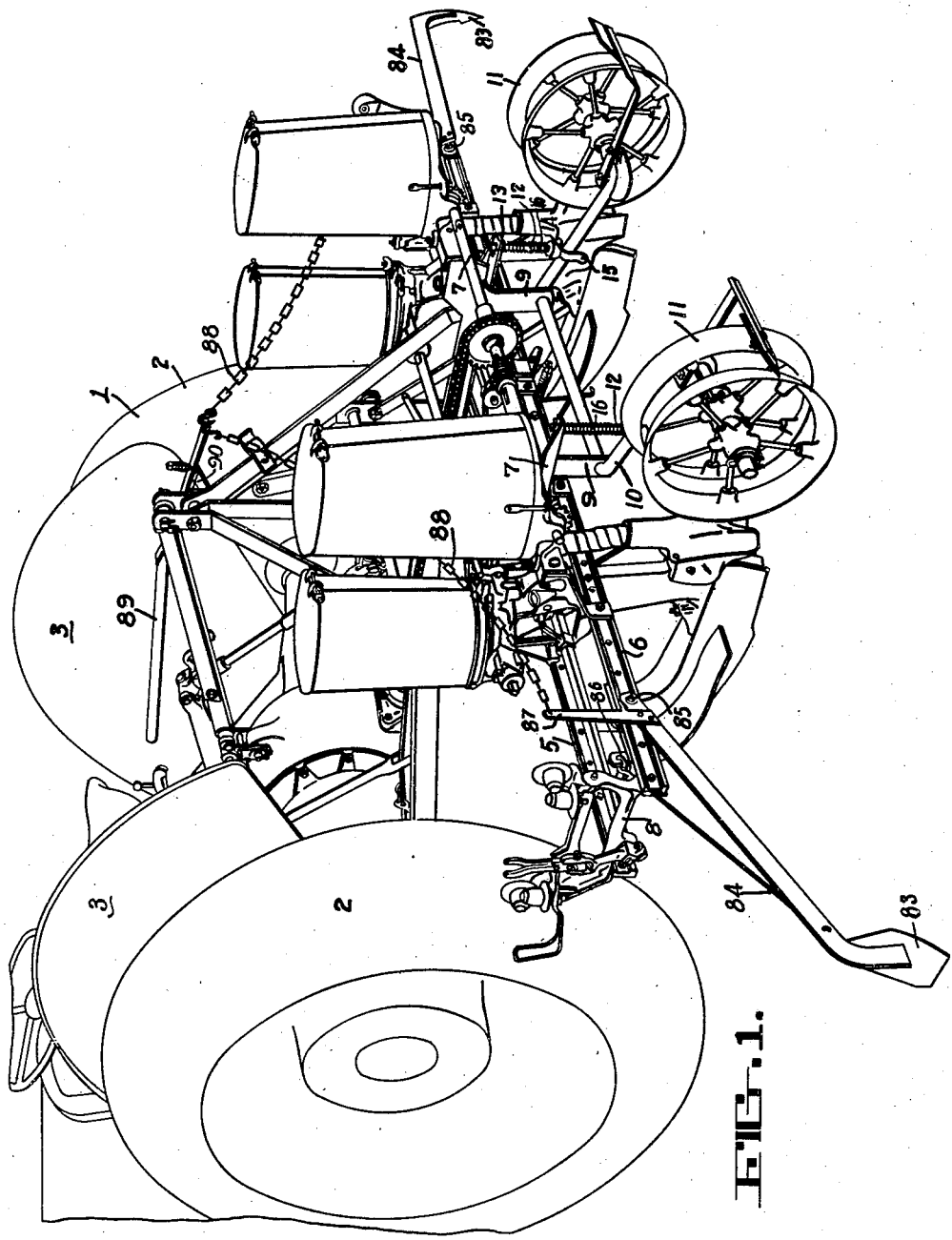

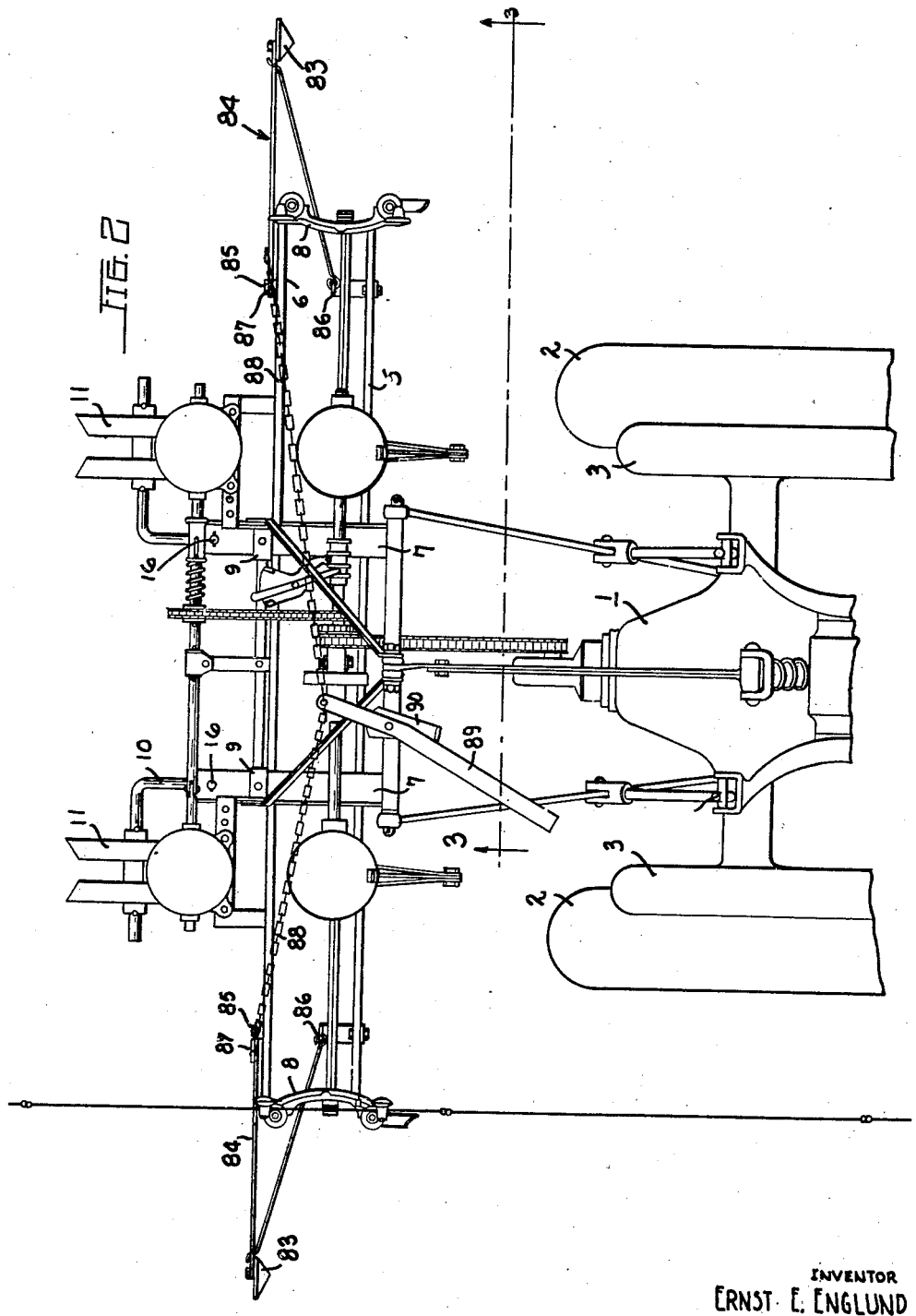

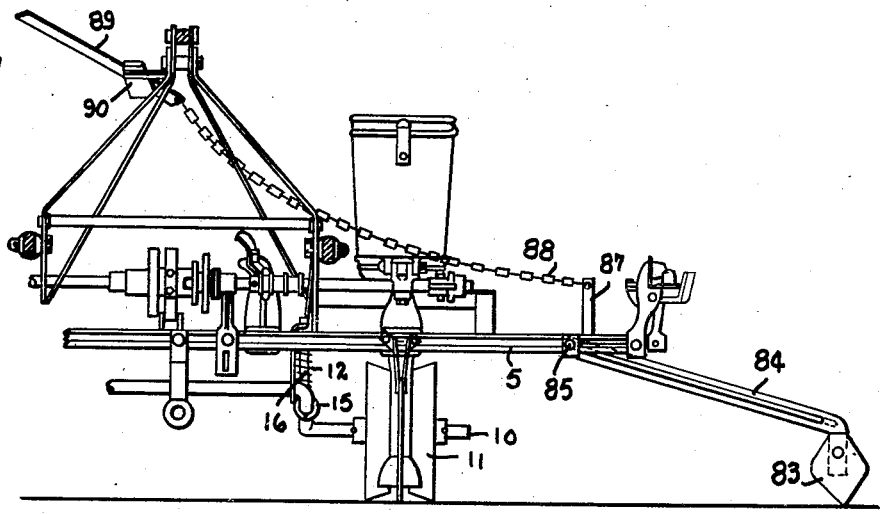

2,371,037

UNITED STATES PATENT OFFICE 2,371,037

SEED PLANTER

Ernst E. Englund, Bellevue, Ohio, assignor to The Ohio Cultivator Co., Bellevue, Ohio, a corporation of Ohio Original application December 26, 1941, Serial No. 424,440. Divided and this application August 7, 1942, Serial No. 453,963

2 Claims. (Cl. 97—230)

The present invention relates to farm machinery, and more especially to corn planters.

This application is a division of my application Ser. No. 424,440, filed Dec. 26, 1941, and entitled "Seed planter."

Corn planters of the type prior to this invention are quite bulky in size, due in no small part to the fact that the large check wire reel is carried at one side of the planter, thus materially increasing its width. Moreover, in these earlier machines it has been the practice to obtain the drive for the corn and fertilizer hoppers from ground wheels which usually extend rearwardly from the machine and thus materially increase the length and bulk of the machine in that direction. There are many other disadvantages in these machines, for example, in the case of the check wire reel there is no practical way in which the speed of the reel can be adjusted to accommodate the increase or decrease of pull when the check wire is being wound on the reel or paid off the reel. And the absence of this adjustment may cause undue strain to be placed on the check wire or cause the wire to be loosely wound on the reel, depending on the specific winding operation.

In most types of earlier planters the change-over of the corn feeding mechanism from check to hill, or to the drill type of planting, is often of a complicated nature and as such may not be satisfactorily performed by the average farmer. Moreover, in the same connection, in earlier corn planters there is often no provision made by which the corn is prevented from being dropped during the time that the planter is moving across the field at the end of its run going from one pair of planted rows to the next pair. It will be understood that the corn which is dropped during this movement of the planter is most likely wasted because the dropped corn is placed at the end of the field, where it is generally impossible to cultivate. The system of scoring or marking for the next double row of planting has not been altogether satisfactory in these earlier planters as the depth of the mark is not adjustable by the driver to suit the conditions of the terrain, but instead is determined by the depth to which a marking wheel sinks into the ground, due to its own weight. Obviously under these conditions, if the ground were hard, the wheel would not make as deep a mark as if the ground were soft, so that it might be impossible for the operator of the planter to see the marked line which determines the next two rows for planting.

The primary object of the invention is to provide a corn planter having an improved mechanism for scoring or marking the position of the next adjacent row or rows. This object is carried out, in brief, by providing markers, preferably on both sides of the planter and of the spade type, these markers being carried on levers pivoted to the frame of the planter in such a way that the operator can elevate or depress the markers by simply moving a hand-operated lever from his position on the planter.

The invention will be better understood when the drawings are studied in connection with the following description.

In the drawings:

Figure 1 is a perspective view of the entire improved planter, together with as much of the tractor as is necessary to show the mechanical connection between the tractor and the planter.

Figure 2 is a plan view looking down on top of the improved planter.

Figure 3 is a longitudinal sectional view taken along the line 3—3 in Figure 2, and looking in the direction of the arrows. It is apparent that in this view practically all of the elements except the shafts cut by the section line are in elevation.

General description of planter framework

As shown more particularly in Figure 1, the planter is adapted to be drawn over the field by any suitable form of tractor, generally designated 1, and preferably provided with heavy traction tires 2, inside mud guards 3 and a rear axle differential. The planter is detachably connected to the tractor at the differential housing by means of a suitable form of rigid hitch.

The horizontal framework of the planter in general comprises a pair of spaced U-shaped structural members 5, 6, extending transversely of the machine, together with a pair of heavy angle-iron pieces 7 which extend across the members 5 and 6 preferably at positions where the greatest load is applied, which would normally be directly over the ground wheels. There is also a third angle iron element which extends between the structural members 5, 6 at a position which corresponds with the central longitudinal axis of the planter. The outermost ends of the members 5, 6 are additionally spanned by rigid bars 8 which carry standard types of pulley holders and tripping catches which are employed in connection with the check wire planting operation. Depending downwardly from the structural member 6 and at positions near the transverse angle irons 7, there is a pair of spaced brackets 9 which serve as hangers for a U-shaped shaft 10 which carries at its ends a pair of tapered ground wheels 11. These ground wheels serve to support the rear end of the planter and in addition serve to cover up the seed corn after it has been planted.

In order to provide for unevenness of terrain, compression springs 12 may be inserted between ledges 13 extending rearwardly of the frame and carried in cups 14 which are secured by a yoke 15 to the U-shaped shaft 10. A rod 16, preferably of arcuate shape, may be encased by each spring in order to maintain rigidity of the planter frame in the horizontal direction. Thus the frame is resiliently supported at the rear by the springs 12, these springs serving to rotate the shaft 10 until the wheels 11 contact the ground. The front end of the rectangular framework is secured to the differential housing of the tractor preferably through a triangularly shaped hitch, and the main purpose of this hitch is to permit the frame of the planter to be swingably elevated when necessary so as to remove the wheels 11 from the ground.

Marking structure and operation

It is necessary to provide some form of marking structure on one but preferably on both sides of the corn planter to set out the proper distance from the last planted row the line over which the corn planter is to move for the next planting row or rows. For this purpose markers 83, preferably of the spade type and terminating in cutting points, are employed. Each marker is carried on a V-shaped bracket 84, one leg of which may be pivotally mounted, as indicated at 85, on the rear structural frame member 6. The other leg is pivotally mounted on a bracket 86 which extends rearwardly from the front structural member 5. An upright bar 87 is riveted or otherwise secured to one of the V-straps 84, and chains 88 are taken, harness fashion, from the upper ends of the bars 87 to a loop formed in a lever 89. The lever 89 is pivotally mounted on a plate 90 (Figure 2) which is supported on the horizontal rod 25.

The lever 89 extends to the operator's position, and the arrangement is such that when the operator moves the bar in one horizontal direction one of the markers 83 is caused to be lowered until the point thereof digs to a noticeable depth into the ground, and the other marker is elevated above the ground. When the lever 89 is moved in the opposite direction, a reverse operation of the markers is obtained. It has been customary, in this connection, to employ disc-like wheels for marking purposes, these discs being carried on arms which extend on both sides of the planter, but I have found that the improved marker 83 is far more practical in that it is extremely rugged and tends to leave a readily discernible marked line of any desired depth which the operator can easily follow with his tractor.

It will be understood that I desire to comprehend within my invention such modifications as come within the scope of the claims and the invention.

Having thus fully described my invention, what I claim as new and desire to secure by Letters Patent, is:

1. A planter comprising a horizontal framework having a pair of spaced transversely extending members, a seed hopper and a pair of rigid markers extending outwardly from the sides of the planter, each of said markers being carried on a V-shaped bracket one leg of which is pivotally mounted on one of said members and the other leg is pivotally mounted on a bracket carried by the other of said members, and a mechanical connection between each of said V-shaped brackets and a common lever positioned at the driver's seat, the arrangement being such that as the lever is moved in one direction one of the markers is elevated and the other marker is depressed, whereas when the lever is moved in the opposite direction the last-named marker is elevated and the remaining marker is depressed, rigid bars extending across the ends of said transversely extending members, said bracket extending from one member toward, but spaced from, the other member whereby said markers may be elevated without interference by one of said bars with the upward movement of said last-named leg.

2. A planter comprising a horizontal framework having a pair of spaced members extending transversely of the planter, a seed hopper and a pair of rigid markers extending outwardly from the sides of the planter, each of said markers being carried on a V-shaped bracket one leg of which is pivotally mounted on one of said members and the other leg is pivotally mounted on a bracket carried by the other of said members, a rigid arm extending from one leg of each of said V-shaped brackets on each side of the planter, an operating lever positioned at the driver's seat, and a flexible connection extending from each of said arms to said lever, the arrangement being such that as the lever is moved in one direction one of the markers is elevated and the other marker is depressed, whereas when the lever is moved in the opposite direction the last-named marker is elevated and the remaining marker is depressed, rigid bars extending across the ends of said transversely extending members, said bracket extending from one member toward, but spaced from, the other member whereby said markers may be elevated without interference by one of said bars with the upward movement of said last-named leg.

ERNST E. ENGLUND.